United States Patent
Maddox

(10) Patent No.: US 6,679,377 B2
(45) Date of Patent: Jan. 20, 2004

(54) FISHING LURE HOLDING APPARATUS

(76) Inventor: John M. Maddox, 436 McMillan Rd., Ochlocknee, GA (US) 31773

( * ) Notice: Subject to any disclaimer, the term of this patent is extended or adjusted under 35 U.S.C. 154(b) by 20 days.

(21) Appl. No.: 09/952,772

(22) Filed: Sep. 14, 2001

(65) Prior Publication Data

US 2003/0052025 A1 Mar. 20, 2003

(51) Int. Cl.⁷ .............................................. B65D 85/00
(52) U.S. Cl. .................................. 206/315.11; 43/54.1
(58) Field of Search .......................... 206/315.1, 315.11, 206/413, 416, 446, 485, 391, 443; 43/54.1

(56) References Cited

U.S. PATENT DOCUMENTS 3,193,179 A * 7/1965 Bogren .................... 229/123.2
4,033,455 A * 7/1977 Robison ..................... 206/391
5,390,789 A * 2/1995 Darby ........................ 206/391

* cited by examiner

Primary Examiner—Jacob K. Ackun
(74) Attorney, Agent, or Firm—Brian D. Bellamy

(57) ABSTRACT

The present invention provides a holding apparatus for fishing lures comprising a plurality of hollow canisters having an open top end and an open bottom end. The canisters are removably secured in the tray via an recessed attaching portion that receives the bottom end of the canisters, and a restraining cap is removably secured to the hollow canisters and includes access to a hollow area of said hollow canisters. The assembled canisters, tray, and restraining cap may be placed in a carrying case for holding a plurality of fishing lures.

2 Claims, 3 Drawing Sheets

FISHING LURE HOLDING APPARATUS

BACKGROUND OF THE INVENTION

1. Field of the Invention

The present invention relates generally to a fishing lure holding apparatus and more particularly to a fishing lure holding apparatus having a plurality of receptacles, wherein each receptacle is designed to receive an individual fishing lure for innately providing for the lures to be housed and protected singularly and separately. Inherently, the present invention renders an efficient and adequate means for storing a plurality of lures so as to provide for a decrease in corrosion of the lures, an elimination of tangling between the lures and their respective hooks, and an increase in safety for users.

2. Description of the Prior Art

Efficiently storing and organizing fishing lures is a goal that is not commonly met by the average fisherman. Generally a fisherman will accumulate a plurality of lures, each shaped differently and colored so as to be specifically designed to catch and attract a particular breed of fish. When not fishing, the lures and jigs are stored within conventional containers, known as tackle boxes.

Tackles boxes are conventional and structurally include stackable trays having a plurality of divider partitions. Though somewhat efficient, these tackle boxes do suffer some shortcomings. One obvious shortcoming is that the tackle box itself fails to include a means of ventilation and/or water drainage. This lack of ventilation and water removal will cause moisture to build up and in time will cause the jig to rust and render the lure useless. Another problem associated with the conventional tackle box is that the lures and jigs tend to escape from the partition, through normal movement, and thus will entangle with other lures and jigs located therein. This entanglement is not only frustrating to resolve, but also the contact with other lures and jigs can damage the lure itself or the finish on the particular lure. This can be detrimental, since the particular shape and/or finish are what are used for attracting a particular type of fish. Another drawback is the lack of visibility due to the stacked configuration. Without clear perceptibility the fisherman will lose valuable time when searching for the desirable lure, making the previous enjoyable sport frustrating and tedious.

What is needed is a holding apparatus that is designed and configured to maintain a plurality of fishing lures. This container should be adapted to maintained the lures, having their jigs inserted therein, in a vertical and upright position, for optimizing on space and providing a nature position for the lure and rendering a resistance to wear.

As will be seen, the present invention achieves its intended purposes, objectives and advantages by accomplishing the needs as identified above, through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a fishing lure holding apparatus having a plurality of holding receptacles. Each receptacle is structured to house and maintain, in a vertical configuration, a singular lure and, optionally, its respective jig. This arrangement will provide for an organized system for maintaining lures, as well as provide a storing means that is advantageous for the user as well as the lure and jig.

To provide for such a configuration, the fishing lure holding apparatus includes a plurality of individual hollow canisters, each having an open top and an open bottom. A holding tray receives the canisters. This holding tray includes a plurality of recess portions that correspond to the number of canisters and to the shape of the lower end. Thereby, providing for the lower end to be located within the recess portion when the canisters are in a stored and transportable position.

For aiding in ventilation and fluid drainage, an aperture extends through the interior area as defined by the recess portion. This aperture is sized for adequate ventilation and fluid/debris drainage, but is sized so as to prevent the lure and jig from escaping therethrough.

Stability of the canisters, when located within the recess portion is achieved by the use of a restraining cap. This retraining cap is substantially the same overall shape as the holding tray and includes a plurality of through holes that correspond to the number of canisters and shape of its respective top end. The through holes are sized slightly larger than the top end of the canisters. The through holes will receive the top end of the canisters so as to allow for the restraining cap to be snuggly secured thereto, consequently providing for the canisters to be held in a steadied, balanced and fixed position.

To enhance the holding apparatus of the present invention, a carrying case can be provided. This carrying case is designed to receive the canisters, holding tray and restraining cap. A handle or the like can be secured to the carrying case for easing the transportability of the apparatus. Various exterior compartments can be added to the carrying case.

Accordingly, it is an object of the present invention to provide a fishing lure holding apparatus that will overcome the deficiencies, shortcomings, and drawbacks of prior tackle boxes, fishing lure holding devices and methods thereof.

Another object of the present invention is to provide a fishing lure holding apparatus that will successfully maintain a plurality of fishing lures in individual compartments for innately providing a safe and organized environment for the lure, intrinsically maintaining its shape, form and function and increasing safety for the user.

Yet a further object of the present invention, to be specifically enumerated herein, is to provide a fishing lure holding apparatus in accordance with proceeding objects and which will conform to conventional forms of manufacture, be of simple construction and easy to use so as to provide a fishing lure holding apparatus that would be economically feasible, long lasting and relatively trouble free during utilization.

Although there have been many inventions related to fishing lures and tackle boxes, none of the inventions have successfully provide a means of individually storing lures in a vertical position while providing proper ventilation properties. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or by modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DETAILED DESCRIPTION OF THE INVENTION

Figure 1:
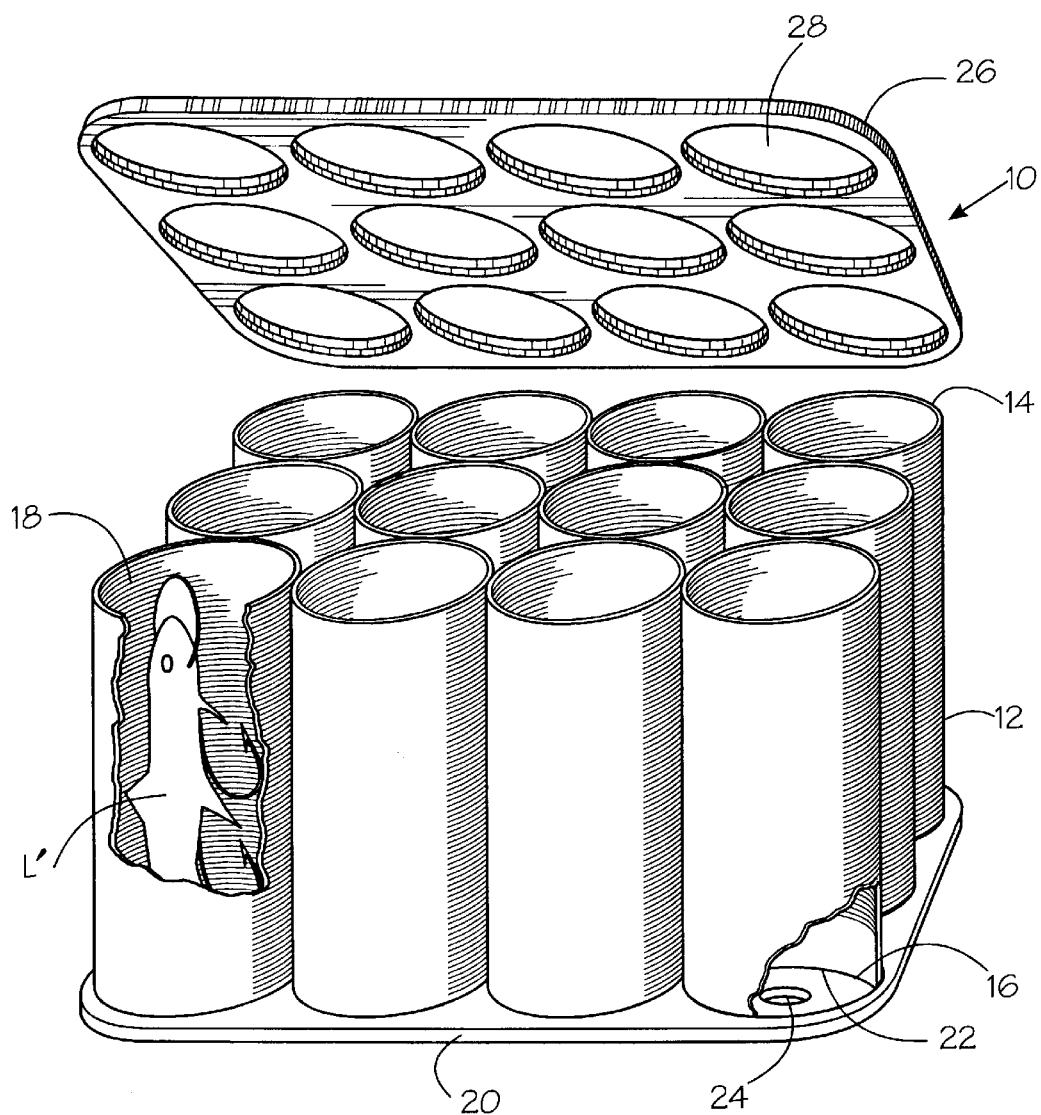
FIG. 1 is a partially exploded perspective view of the fishing lure holding apparatus of the present invention including cut-away views.
Figure 2:
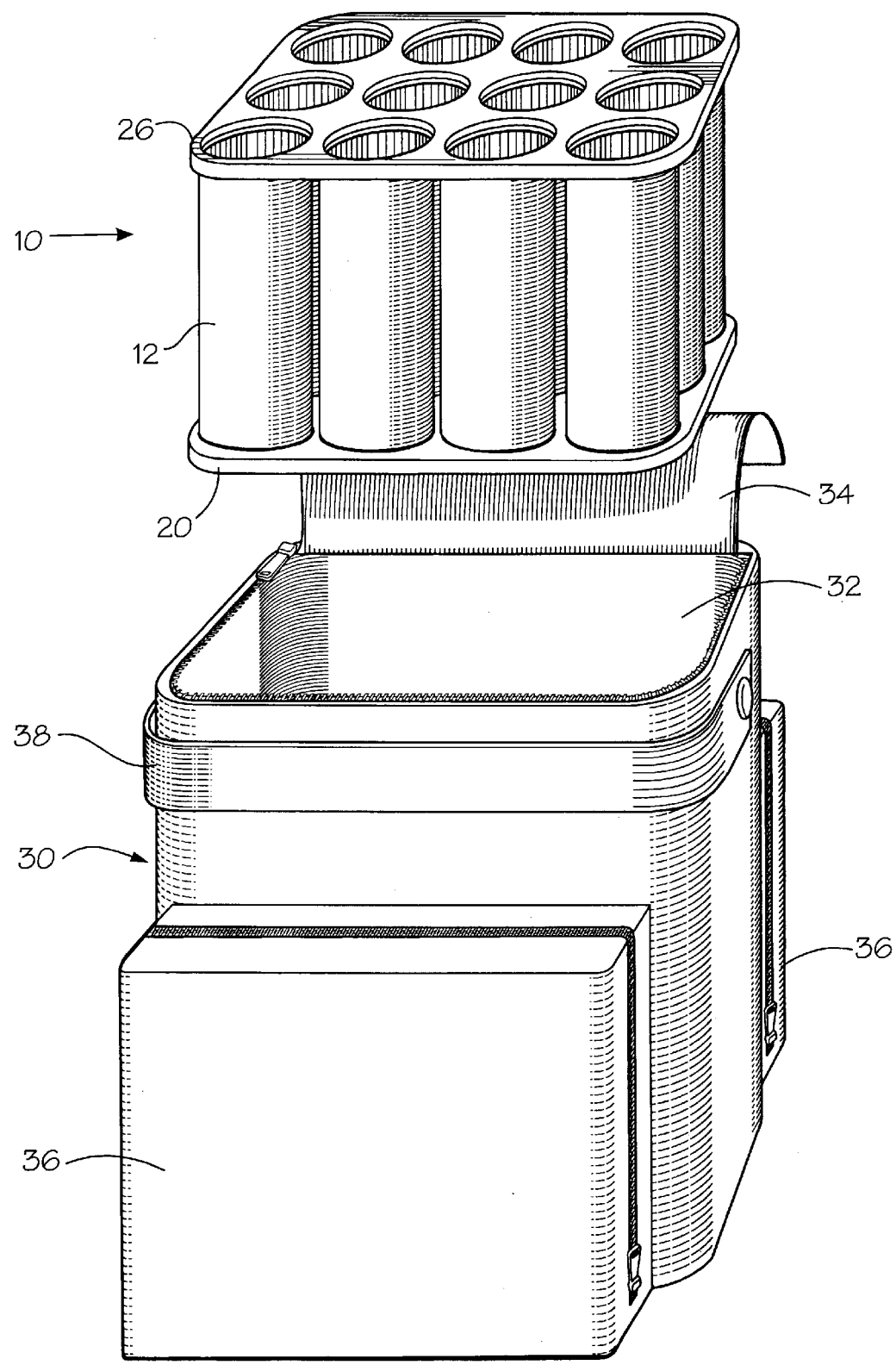
FIG. 2 is an exploded view of the fishing lure holding apparatus of the present invention illustrating the carrying case.

With reference to the drawings, in particular to FIGS. 1 and 2 thereof, the present invention; a fishing lure holding apparatus, denoted by reference numeral 10 will be described. Shown is a fishing lure holding apparatus 10 comprising a plurality of elongated hollow canisters 12 having an open top end 14 and an open bottom end 16. The canisters can have any shape or configuration and the hollow area is designed to maintain and housed fishing lures, and optionally, their respective jigs secured thereto. For durability, the canisters are preferably fabricated from a durable and anti-corrosive material. Thereby, providing for the canisters to be rigid and inflexible elongated members. Each canister forms a holding receptacle for a singular fishing lure and, optionally, its respective jig.

Each receptacle includes a hollow area 18 that is structured to house and maintain a singular lure L and, optionally, its respective jig. When located therein, the lure L will be in a vertical position, as seen in FIG. 1. This vertical position is least destructive to the finish and shape of the particular lure. Having a plurality of holding receptacles for the lures provides an inherent organizing system that can be beneficial, not only to the user, but to the lure and jig as well.

Enclosing the bottom of the elongated hollow canister 12 is accomplished by the use of a tray 20. The tray 20 receives the lower end 16 of each canister 12. As seen in FIG. 1, the holding tray 20 includes a plurality of recess portions 22 that correspond to the number of canisters and to the shape of the lower end. By way of example, FIG. 1 illustrated twelve canisters having canisters with a circular cross section. Thus, the tray in this example includes twelve circular recesses that correspond to the twelve cylindrical shaped canisters. It is noted that the number, length, width, shape and size of the canisters is dependent upon the number of lures that are desired to be store as well as to the overall shape and size of the particular lure.

For aiding in ventilation and fluid drainage, an aperture 24, as seen in FIG. 1, extends through the interior area as defined by each recess portion 22. This aperture 22 is sized for adequate ventilation and fluid/debris drainage, but is sized so as to prevent the lure and jig from escaping therethrough. Thus, as seen, each receptacle will include its own aperture 22.

To avoid non-stability of the canisters 12, when located within the recess portion 22, a restraining cap 26 is secured to the upper end. This restraining cap when attached thereto will still allow accessibility into the interior area of each receptacle or canister 12. As seen in FIGS. 1 and 2, this retraining cap 26 is substantially the same overall shape as the holding tray 20 and includes a plurality of through holes 28 that correspond to the number and shape of the canisters and top end, respectively. The through holes 28 are sized slightly larger than the top end 14 of the canisters 12. These through holes 28 will receive the top end of the canisters. Accordingly, the restraining cap will be snuggly secured to the receptacles 12. Securing the restraining cap 26 to the plurality of the canisters 12 renders the receptacles to be in a steadied, balanced and fixed position.

When the tray 20 and restraining cap 26 are secured to the plurality of receptacles 12, the present invention 10 is ready for accepting and storing the desired items. Having an open top end provides visibility and accessibility of the items stored therein. Having an aperture located within each receptacle enables fluid to escape and ventilation to occur, thus reducing if not eliminating corrosion of the item stored within each receptacle. In addition, having removable components provides an apparatus that is easy to maintain, clean and assemble.

Figure 3:
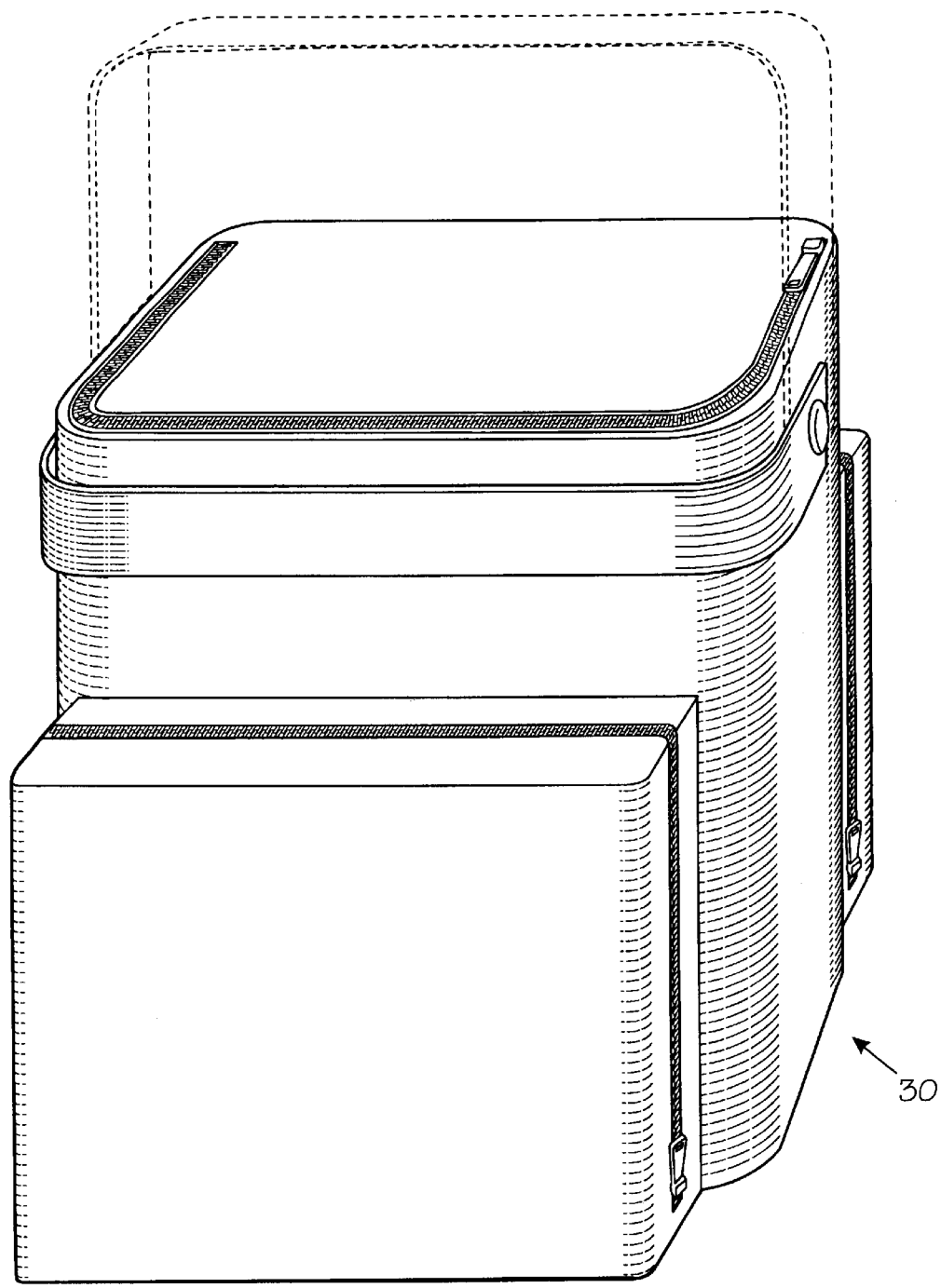
FIG. 3 is a front perspective view of the carrying case used to maintain the fishing lure holding apparatus of the present invention.

To enhance the holding apparatus of the present invention, a carrying case 30, as seen in FIGS. 2 and 3 can be provided. This carrying case 30 is designed to receive the canisters, holding tray and restraining cap. To enable such a configuration, as seen in FIG. 2 and 3, this carrying case 30 includes an open top 32 that exposes the interior area of the case. This interior area will house and maintain the holding receptacles.

A lid 34 can be removably secured to this open top 32 for protecting the housed items. Additional storage can be achieved via additional compartments 36. These compartments can include conventional access devices for providing closure and accessibility for the items stored therein. Aiding in transporting the carrying case is the use of a handle 38. The handle can be pivotally secured, as seen in FIGS. 2 and 3.

While the present invention has been particularly shown and described with reference to an embodiment thereof, it will be understood by those skilled in the art that various changes in form and detail may be made without departing from the spirit and scope of the present invention.

I claim:

1. A holding apparatus for fishing lures comprising:
   a plurality of hollow canisters having an open top end and an open bottom end;
   a tray;
   said plurality of hollow canisters being secured via an attaching device to said tray;
   a restraining cap;
   said restraining cap being secured to said hollow canisters and said restraining cap includes access to a hollow area of said hollow canisters; and
   a carrying case removably receives said plurality of hollow canisters secured to said tray and said restraining cap secured to said canisters.

2. A holding apparatus for fishing lures comprising:
   a plurality of hollow canisters having an open top end and an open bottom end;
   a tray;
   said plurality of hollow canisters being removably secured via an attaching device to said tray;
   a restraining cap;
   said restraining cap being removably secured to said hollow canisters and said restraining cap includes access to a hollow area of said hollow canisters and
   a carrying case removably receives said plurality of hollow canisters secured to said tray and said restraining cap secured to said canisters.

* * * * *